United States Patent [19]

Haberman et al.

[11] Patent Number: 5,456,290
[45] Date of Patent: Oct. 10, 1995

[54] TUBE PLUG HAVING A FLANGE SEALING A CHAMBER FOR PLUGGING A TUBULAR MEMBER

[75] Inventors: Eric R. Haberman, Penn Township; James W. Everett, Hempfield Township; Robert F. Keating, Penn Township; David A. Snyder, North Huntingdon, all of Pa.

[73] Assignee: Westinghouse Electric Corporation, Pittsburgh, Pa.

[21] Appl. No.: 772,622

[22] Filed: Oct. 4, 1991

Related U.S. Application Data

[63] Continuation of Ser. No. 439,118, Nov. 20, 1989, abandoned.

[51] Int. Cl.⁶ .................................................. F16L 55/12
[52] U.S. Cl. ............................... 138/89; 376/203; 165/71
[58] Field of Search .................... 138/89; 165/71, 165/76; 376/203, 204; 411/55

[56] References Cited

U.S. PATENT DOCUMENTS

| | | | |
|---|---|---|---|
| 1,112,557 | 10/1914 | Read | 411/55 |
| 3,135,414 | 6/1964 | Lee | 138/89 |
| 3,525,365 | 8/1970 | Meulendyk | 138/89 |
| 4,091,841 | 5/1978 | Beneker et al. | 138/89 |
| 4,310,029 | 1/1982 | Dudek . | |
| 4,366,617 | 1/1983 | Nanstiel et al. . | |
| 4,369,662 | 1/1983 | Rieben et al. . | |
| 4,390,042 | 6/1983 | Kucherer et al. . | |
| 4,436,117 | 3/1984 | Martin . | |
| 4,474,216 | 10/1984 | Noe . | |
| 4,502,511 | 3/1985 | Zafred . | |
| 4,590,991 | 5/1986 | Cooper et al. | 138/89 |
| 4,637,436 | 1/1987 | Stewart, Jr. et al. . | |
| 4,646,816 | 3/1987 | Rothstein | 138/89 |
| 4,653,540 | 3/1987 | Epstein . | |
| 4,723,578 | 2/1988 | Mordarski et al. . | |
| 4,751,944 | 6/1988 | Sinha et al. . | |
| 4,765,374 | 8/1988 | Ermold et al. . | |
| 4,771,810 | 9/1988 | Ermold et al. . | |
| 4,787,420 | 11/1988 | Wilhelm . | |
| 4,823,846 | 4/1989 | Everett et al. . | |
| 4,982,763 | 1/1991 | Klahn | 138/90 |

Primary Examiner—James E. Bryant, III
Attorney, Agent, or Firm—Walter S. Stevens

[57] ABSTRACT

Tube plug and method for plugging a heat exchanger tube having an inner wall, which tube plug has a reduced susceptibility to stress corrosion cracking. The tube plug includes a shell having a closed end, an open end and an outer wall, the shell defining a chamber therein in communication with the open end of the shell. Disposed in the chamber is an expander member for expanding the outer wall of the shell into sealing engagement with the inner wall of the tube. A sealing member engages the expander member and is disposed across the open end of the shell for sealing the chamber defined by the shell so that fluid can not enter the chamber to corrosively attack the shell.

4 Claims, 6 Drawing Sheets

TUBE PLUG HAVING A FLANGE SEALING A CHAMBER FOR PLUGGING A TUBULAR MEMBER

This application is continuation, of application Ser. No. 07/439,118 filed Nov. 20, 1989, now abandoned.

BACKGROUND OF THE INVENTION

This invention generally relates to apparatus and methods for plugging tubular members and more particularly relates to a tube plug for plugging a heat exchanger tube, such as a nuclear steam generator tube, which tube plug has a reduced susceptibility to stress corrosion cracking.

Although devices and methods for plugging nuclear steam generator tubes are known in the art, it has been observed that these devices and methods have a number of operational problems associated with them. However, before these problems can be appreciated, some background is necessary as to the structure and operation of a nuclear steam generator.

A nuclear heat exchanger or steam generator generates steam when heat is transferred through heat conductors from a heated, pressurized and radioactive primary fluid to a non-radioactive secondary fluid. The primary fluid flows through a plurality of tubes (i.e., a tube bundle) as the secondary fluid flows across the exterior surfaces of the tubes which are disposed in the steam generator. The walls of the tubes function as the heat conductors for conducting heat from the primary fluid flowing through the tubes to the secondary fluid flowing across the exterior surfaces of the tubes.

Because the primary fluid flowing in the steam generator tubes is radioactive, the steam generator is designed such that the radioactive primary fluid flowing in the tubes does not radioactively contaminate the nonradioactive secondary fluid flowing across the tubes. Therefore, the tubes are designed to be leak-tight so that the radioactive primary fluid remains separated from the nonradioactive secondary fluid to avoid commingling the primary fluid with the secondary fluid.

Occasionally, due to tube wall intergranular cracking caused by stress and corrosion during operation (i.e., known in the art as primary water stress corrosion cracking), the steam generator tubes may degrade (i.e., experience tube wall thinning) and develop surface and volume flaws and thus may not remain leak-tight. If through-wall cracking occurs due to the flaws or degradation, the radioactive primary fluid may commingle with the nonradioactive secondary fluid. Thus, the steam generator tubes are typically non-destructively inspected to determine if any tubes have flaws. If flaws are indicated, the suspect tube is removed from service such as by plugging the open ends of the degraded tube. On the other hand, the tube, although degraded, may remain in service by sleeving the degraded portion of the tube. In either case, the radioactive primary fluid is prevented from commingling with the non-radioactive secondary fluid even though the wall of the tube is degraded.

As stated hereinabove, a degraded tube may be plugged to remove it from service. A tube plug for this purpose comprises an "INCONEL" tubular shell that is open on one end and closed at the other end, and which contains a frusto-conically shaped expander member. The expander element is a conical wedge and is disposed completely within the interior of the shell with its larger circular end facing the inner surface of the closed distal end of the plug shell. Instead of being perfectly cylindrical, the interior walls of the shell are slightly tapered by increasing the thickness of the shell walls from the distal closed end to the proximal open end. When the wedge is forcefully pulled from the closed end toward the open end of the shell, it will radially expand the plug into sealing engagement with the inner wall of the steam generator tube by a wedging action. Such a plug is disclosed by U.S. Pat. No. 4,390,042 issued Jun. 28, 1983 in the name of Harvey D. Kucherer et al. entitled "Tube Plug" and assigned to the Westinghouse Electric Corporation. Although this tube plug will satisfactorily plug the tube, the inner surface of the plug shell is nonetheless exposed to the pressurized primary fluid which will pass through the open end of the plug shell and contact the inner surface of the plug shell. As explained hereinbelow, this is undesirable because the primary fluid may corrosively attack the inner surface of the plug shell under certain conditions and cause cracks to occur in the shell. Such a cracked shell may then allow the radio-active primary fluid to commingle with the nonradioactive secondary fluid.

In this regard, it has been observed that when a steam generator tube is plugged with a tube plug composed of "INCONEL" material which has undergone a particular annealing process, the tube plug itself may experience primary water stress corrosion cracking because the inner surface of the tube plug is exposed to the primary water. If through-wall cracks develop in the tube plug, the tube plug may not remain leak-tight; therefore, the cracked tube plug may allow the radioactive primary fluid to commingle with the nonradioactive secondary fluid. Moreover, if the tube plug cracking is severe, portions of the tube plug may fracture away from or separate from the tube plug and be propelled along the inside of the steam generator tube due to the pressure of the primary water acting against the interior surface of the tube plug. It has been observed that propulsion of the separated portion of the tube plug in the tube may severely damage the tube in which the tube plug is disposed. Therefore, it is desirable to provide a tube plug that has a reduced susceptibility to stress corrosion cracking.

Hence, although devices and methods for plugging tubular members are known in the art, the prior art does not appear to disclose a tube plug for plugging a tubular member wherein the tube plug has a reduced susceptibility to stress corrosion cracking.

Therefore, what is needed is a tube plug for plugging a tubular member wherein the tube plug has a reduced susceptibility to stress corrosion cracking.

SUMMARY OF THE INVENTION

Disclosed herein is a tube plug for plugging a tubular member having an inner wall, wherein the tube plug has a reduced susceptibility to stress corrosion cracking. The tube plug comprises a shell having a closed end, an open end and an outer wall, the shell defining a chamber therein in communication with the open end of the shell. Disposed in the chamber is an expander member for expanding the outer wall of the shell into sealing engagement with the inner wall of the tubular member. A sealing member engages the expander member and is disposed in the open end of the shell for sealing the chamber defined by the shell so that fluid can not enter the chamber to corrosively attack the shell.

An object of the invention is to provide a tube plug for plugging a tubular member having an inner wall, the tube plug comprising (a) a shell having a closed end, an open end and an outer wall and defining a chamber in the shell in communication with the open end of the shell, (b) expander means disposed in the chamber for expanding the outer wall of the shell into sealing engagement with the inner wall of the tubular member, and (c) seal means engaging the expander means and disposed in the open end of the shell for sealing the chamber defined by the shell so that fluid will not enter the chamber to corrosively attack the shell.

Another object of the invention is to provide a tube plug sealing member for sealing a tube plug, the tube plug defining a chamber therein and having an open end in communication with the chamber, the sealing member comprising a flange extending sealingly across the open end of the tube plug for sealingly abutting the open end of the tube plug for sealing the chamber and for attaching the sealing member to the tube plug.

These and other objects of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings wherein:

DESCRIPTION OF THE PREFERRED EMBODIMENT(S)

Disclosed hereinbelow are a tube plug for plugging a tubular member, such as a nuclear steam generator tube, which tube plug has a reduced susceptibility to stress corrosion cracking.

Figure 1:
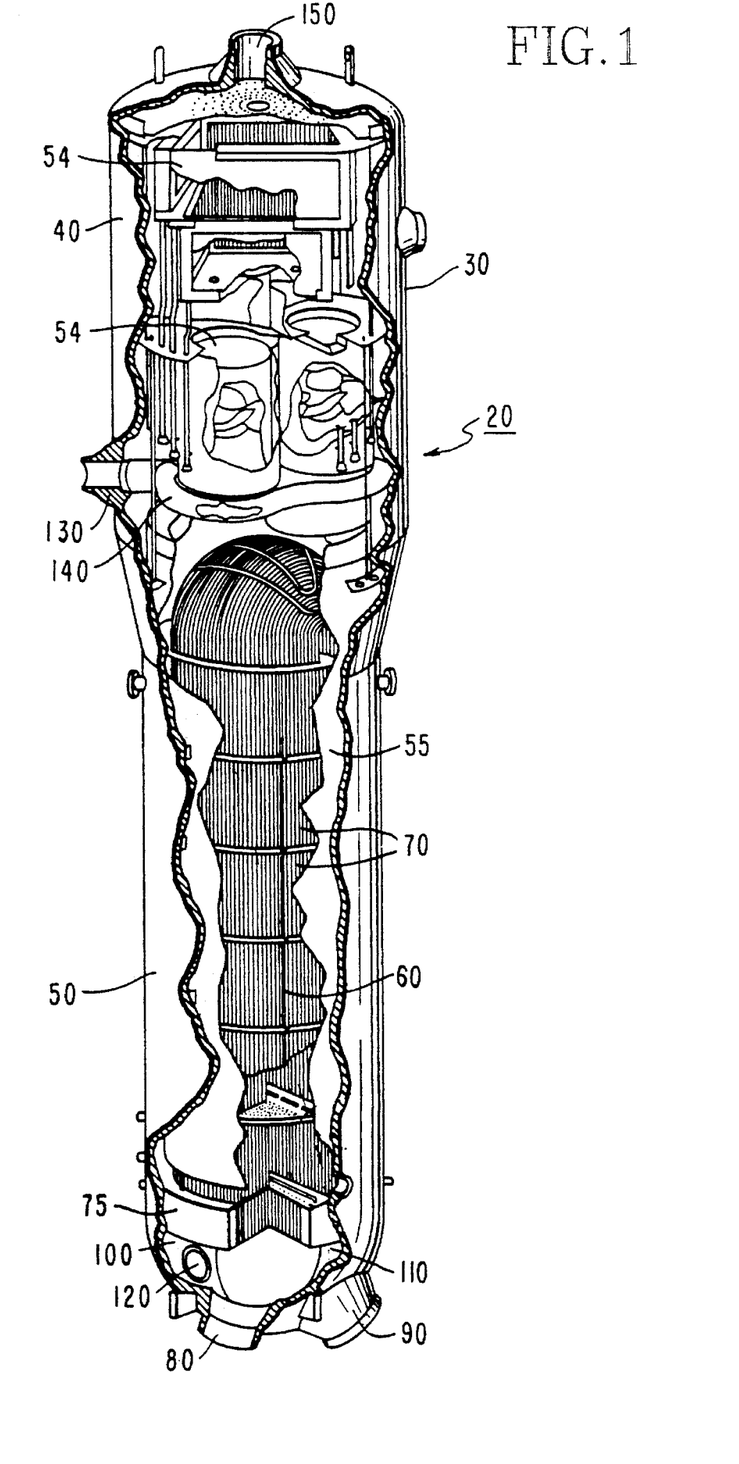
FIG. 1 shows a nuclear steam generator in partial vertical section with parts removed for clarity.

Referring to FIG. 1, there is shown a nuclear steam generator, generally referred to as 20, for generating steam. Steam generator 20 comprises a generally cylindrical outer hull 30 having a cylindrical upper portion 40 and a cylindrical lower portion 50. Disposed in upper portion 40 is moisture separating means 54 for separating a steam-water mixture (not shown). Disposed in lower portion 50 is an inner hull 55 which is closed at its top end except for a plurality of openings in its top end for allowing passage of the steam-water mixture from inner hull 55 to moisture separating means 54. Disposed in inner hull 55 is a vertical steam generator tube bundle 60 having a plurality of vertical U-shaped steam generator tubes 70. Disposed in lower portion 50 and attached thereto is a tube sheet 75 having a plurality of apertures therethrough for receiving the ends of each tube 70. Disposed on outer hull 30 are a first inlet nozzle 80 and a first outlet nozzle 90 in fluid communication with an inlet plenum chamber 100 and with an outlet plenum chamber 110, respectively. A plurality of manway holes 120 are formed through outer hull 30 below tube sheet 75 for providing access to inlet plenum chamber 100 and outlet plenum chamber 110. Formed through outer hull 30 above tube bundle 60 is a second inlet nozzle 130, which is connected to a perforated feeding 140 disposed in upper portion '40 for allowing entry of secondary fluid (not shown) into upper portion 40. The secondary fluid, which may be demineralized water, will flow through inlet nozzle 130, into upper portion 40 and through the perforations (not shown) of feeding 140. A second outlet nozzle 150 is disposed on the top of upper portion 40 for exit of steam from steam generator 20.

During operation of steam generator 20, primary fluid, such as demineralized water, enters inlet plenum chamber 100 through first inlet nozzle 80 and flows through tubes 70 to outlet plenum chamber 110 where the heated primary fluid exits steam generator 20 through first outlet nozzle 90. The secondary fluid enters feeding 140 through second inlet nozzle 130 and flows downwardly from the perforations of feeding 140. In a typical pressurized water reactor steam generator, the primary fluid may obtain a temperature of approximately 650 degrees Fahrenheit and a pressure of approximately 2250 pounds per square inch absolute (psia) and the secondary fluid may obtain a temperature of approximately 540 degrees Fahrenheit and a pressure of approximately 1000 psia. Hence, a portion of the secondary fluid vaporizes into a steam-water mixture due to conductive heat transfer from the primary fluid to the secondary fluid through the walls of tubes 70 which comprise bundle 60 and which function as heat conductors. The steam-water mixture flows upwardly from bundle 60 and is separated by moisture separating means 54 into saturated water and dry saturated steam. Thus, as the secondary fluid enters feeding 140, dry saturated steam exits steam generator 20 through second outlet nozzle 150. Moreover, the primary fluid is radioactive; therefore, steam generator 20 is designed such that the primary fluid is nowhere in direct fluid communication with the secondary fluid in order that the secondary fluid is not radioactively contaminated by commingling with the primary fluid.

Figure 2:
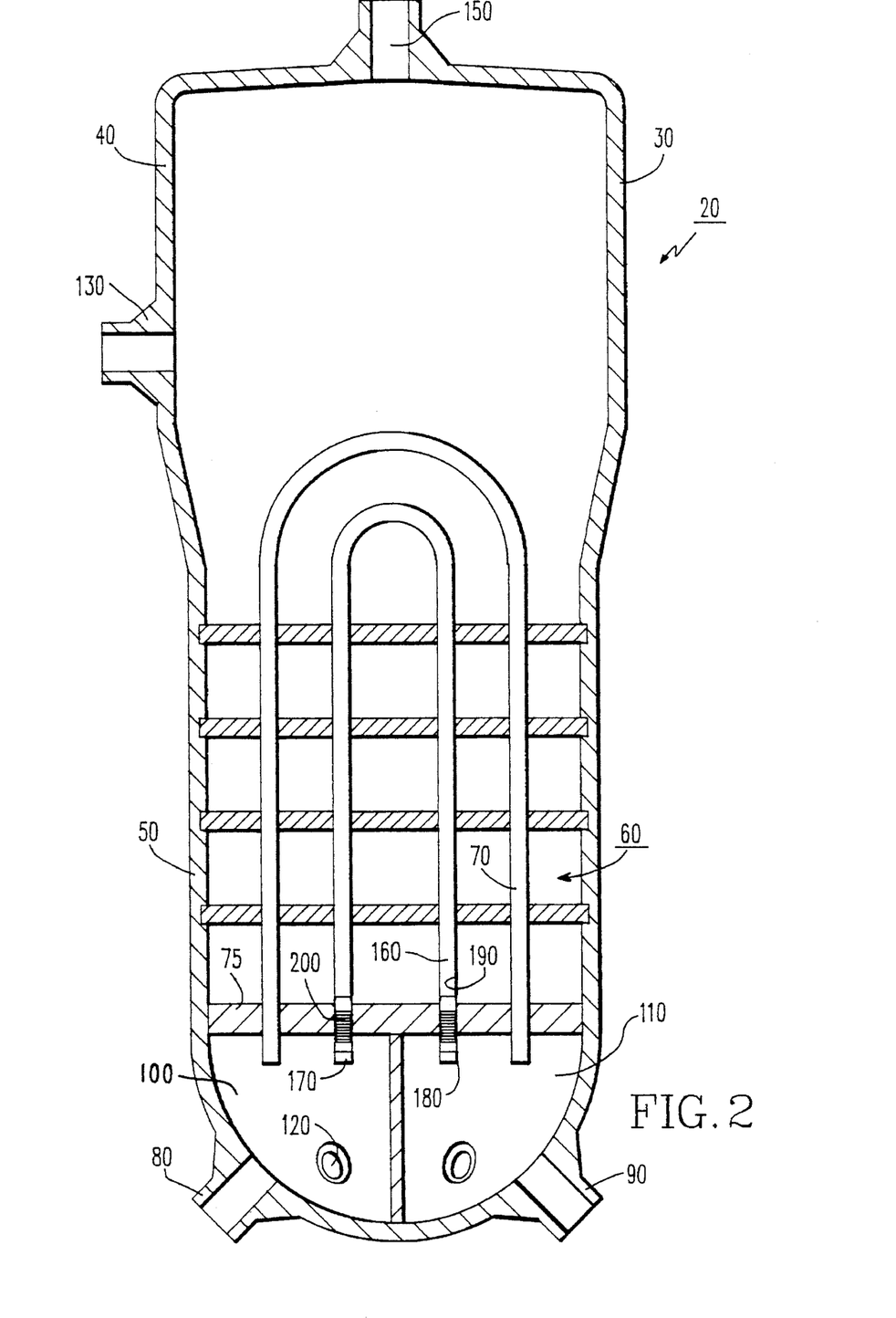
FIG. 2 schematically illustrates the steam generator in partial vertical section with parts removed for clarity and also shows two steam generator tubes, one of the tubes having tube plugs disposed in the open ends thereof.

Referring to FIG. 2, steam generator 20 is there schematically shown having the plurality of tubes 70 (only two of which are shown) disposed therein. One of the tubes 70, for example a tube 160 having a first open end 170, a second open end 180, and an inner wall 190, may have become degraded due to primary water stress corrosion cracking which may have occurred during operation of steam generator 20. Tube 160 may have a crack (not shown) through inner wall 190 at a degraded portion thereof (not shown) which will allow the commingling of the radioactive primary fluid with the nonradioactive secondary fluid. To prevent the commingling of the radioactive primary fluid with the nonradioactive secondary fluid, steam generator 20 is taken out of service in a manner well known in the art and a tube plug 200 is disposed in first open end 170 and in second open end 180 for plugging the degraded tube 160. After tube 160 is plugged, steam generator 20 is returned to service. However, the phenomenon of stress corrosion cracking which caused tube 160 to degrade may also affect tube plug 200 and thus cause tube plug 200 to likewise degrade. Therefore, as described in more detail hereinbelow, tube plug 200 is configured such that it has a reduced susceptibility to degradation caused by stress corrosion cracking.

Figure 3:
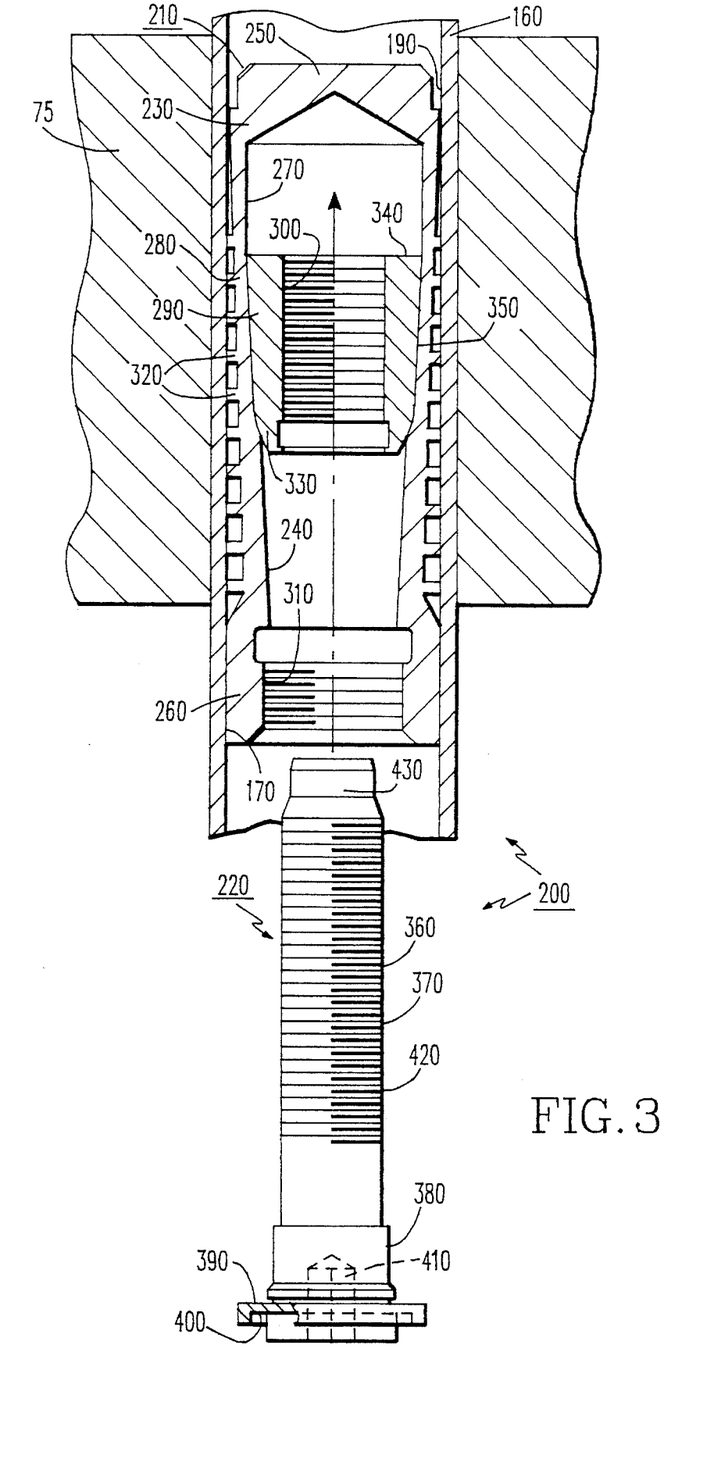
FIG. 3 illustrates the tube plug belonging to the invention in exploded view and partial vertical section.

Therefore, referring to FIG. 3, tube plug 200 is shown having a plug portion, generally referred to as 210, and having means, generally referred to as 220, for sealing plug portion 210 so that tube plug 200 has a reduced susceptibility to stress corrosion cracking. The plug portion 210 of tube plug 200 comprises a substantially cylindrical shell member 230 manufactured from a metal such as "INCONEL". The metal "INCONEL" is an alloy composed substantially of nickel, chromium, and iron and a trace amount of cobalt. Shell 230 has a conical inner surface 240 which has a larger diameter at a closed end 250 and a smaller diameter at an open end 260 of shell 230, the shell 230 defining a chamber 270 therein in communication with open end 260. Shell 230 also has an outer wall 280 for engaging inner wall 190 of tube 160. Disposed in chamber 270 is means, such as an expander member 290 having a threaded cylindrical bore 300 therethrough, for expanding outer wall 280 into sealing engagement with inner wall 190 of tube 160 for plugging tube 160. Inner surface 240 is formed such that expander member 290 is captured within shell 230 so that movement of expander member 290 relative to inner surface 240 causes shell 230 to expand without allowing expander member 290 to be removed from shell 230. Shell 230 also has a threaded cylindrical passageway 310 near open end 260 which has a diameter larger than the smallest diameter of inner surface 240 for allowing apparatus (not shown) to be inserted through threaded passageway 310 and into chamber 270. Shell 230 also has a substantially uniform wall thickness in the portion of shell 230 that is expanded by expander member 290. Outer wall 280 of shell 230 includes a plurality of lands 320 therearound and integrally formed therewith in a manner such that the height of each land 320 increases from closed end 250 to open end 260 while the outer surfaces of all lands 320 are maintained at approximately the same external diameter. Shell 230 is also configured such that the area near open end 260 has a thicker wall section than the remainder of shell 230 to provide stability in extracting plug portion 210 from tube 160.

Still referring to FIG. 3, expander member 290, which belongs to plug portion 210, may be manufactured from a hardenable metal such as stainless steel alloy Carpenter 455 and is formed such that it has a leading end 330 which has a tangentially blended radius that minimizes "plowing" or pushing metal ahead of expander member 290 when expander member 290 is pulled through shell 230. Expander member 290 may also have a polished exterior surface that enhances its movement relative to shell 230. Expander member 290 also has a trailing edge 340 which is formed to have a sharp edge such that it provides a self-locking mechanism. The sharp edge feature of trailing edge 340 retains expander member 290 from moving toward closed end 250 of shell 230, thereby preventing inadvertent diametral contraction of shell 230. However, the construction of expander member 230 is such that the sharp edge feature of trailing edge 340 does not prevent expander member 290 from being pushed toward closed end 250 by a plug removal tool (not shown). Expander member 290 is also provided with a conical outer surface 350 that is arranged such that its outside diameter is smaller near leading end 330 and larger near trailing edge 340. The shape of outer surface 350 provides a mechanism for expanding shell 230 when expander member 290 is moved relative to shell 230. Thus, plug portion 210 as described hereinabove may be of the type fully disclosed in U.S. Pat. No. 4,390,042 issued Jun. 28, 1983 in the name of Harvey D. Kucherer et al. entitled "Tube Plug" and assigned to the Westinghouse Electric Corporation, the disclosure of which is hereby incorporated by reference.

Figures 4, 5:
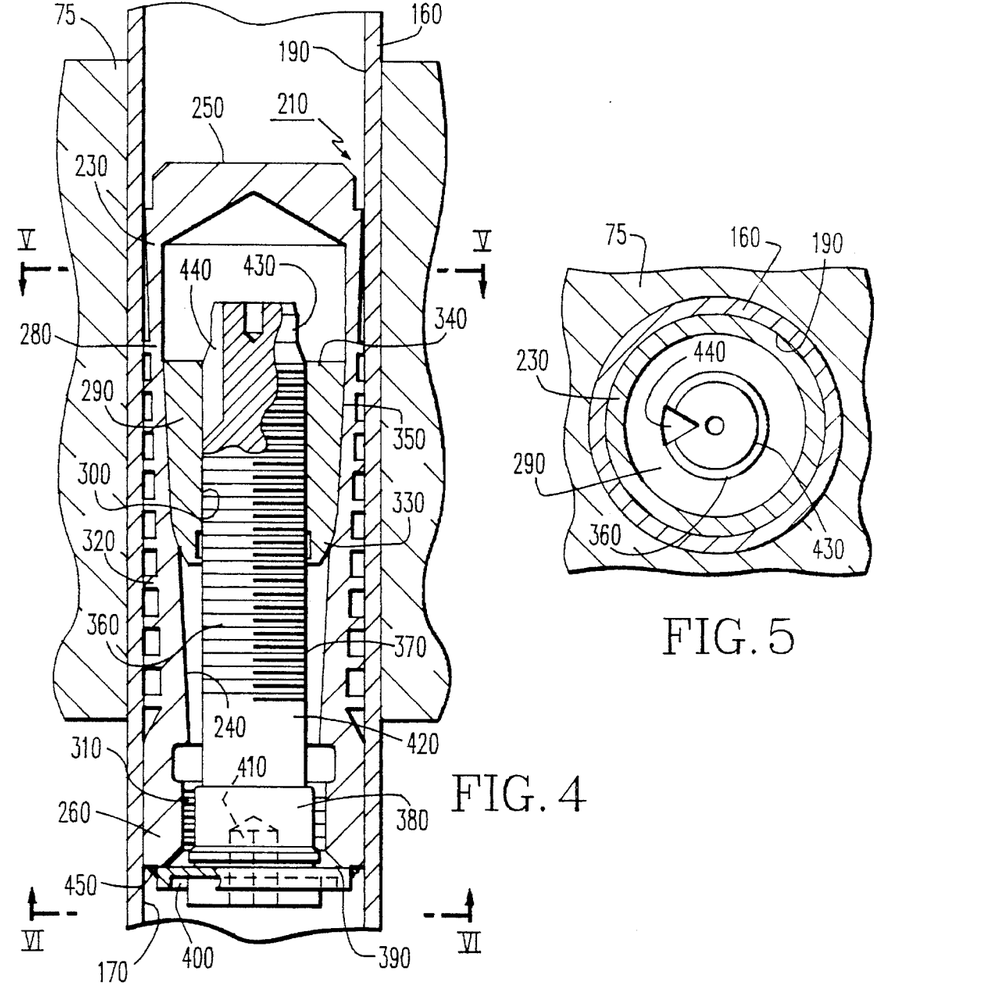
FIG. 4 shows in partial vertical section the tube plug fully assembled for providing a tube plug having a reduced susceptibility to stress corrosion cracking.
FIG. 5 is a plan view of the tube plug taken along section line V—V of FIG. 4.

Referring to FIGS. 3 and 4, seal means 220 may be an elongated sealing member 360 having a distal end portion 370 for engaging expander member 290 and having a generally cylindrical proximal end portion 380 capable of being disposed substantially in open end 260 of shell 230. Sealing member 360 may be "INCONEL" for resisting stress corrosion cracking. Therefore, sealing member 360 and shell 230 may both be made from the same material for minimizing stresses therein due to differential thermal expansion. When sealing member 360 is disposed in shell 230, distal end portion 370 is defined as that end portion of sealing member 360 nearer closed end 250 of shell 230 and proximal end portion 380 is defined as that end portion of sealing member 360 nearer open end 260 of shell 230. Sealing member 360 comprises a generally circular flange 390 integrally attached to and surrounding proximal end portion 380. Flange 390 extends radially outwardly from proximal end portion 380 and across open end 260 for closing open end 260 so that chamber 270 defined by shell 230 is substantially sealed thereby. Moreover, it will be appreciated that flange 390 also functions as means for preventing overinsertion of sealing member 360 into shell 230 because flange 390 will abut open end 260 when flange 390 is suitably inserted in shell 230. As described in more detail hereinbelow, flange 390 has a circumferential groove 400 therein for allowing flange 390 to flex so that flange 390 is maintained in sealingly abutting relationship against open end 260. Moreover, formed in proximal end portion 380 may be a polygonally-shaped recess 410 for receiving apparatus (not shown) capable of inserting sealing member 360 into and retrieving sealing member 360 from plug portion 210.

As best seen in FIGS. 4 and 5, distal end portion 370 may be a threaded cylindrical shaft 420 for matingly threadably engaging the cylindrical threaded bore 300 formed through expander member 290. Shaft 420 may have a generally cylindrical lead-in pilot section 430 of a diameter smaller than bore 300 and integrally attached to the terminal end of distal end portion 370 of shaft 420 for easily registering distal end portion 370 into bore 300. For reasons to be disclosed hereinbelow, shaft 420 preferably extends above expander member 290 when fully inserted therethrough. Shaft 420 may also have a cleaning slot 440 longitudinally extending a predetermined distance along the exterior surface thereof for receiving apparatus (not shown) capable of cleaning the threads belonging to threaded shaft 420.

Figure 6:
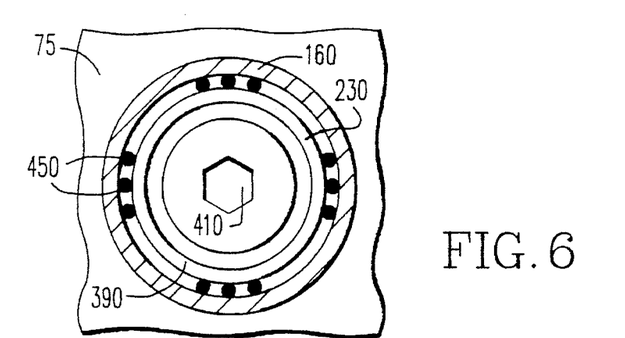
FIG. 6 is a view of the tube plug taken along section line VI—VI of FIG. 4.

Referring to FIGS. 4 and 6, flange 390 is attached, such as by welding, to shell 230 for attaching sealing member 220 to shell 230. By way of example only, flange 390 may be attached to shell 230 by a plurality of tack welds 450. Alternatively, flange 390 may be attached to shell 230 by a continuous weld bead (not shown) extending circumferentially around flange 230.

Figure 7:
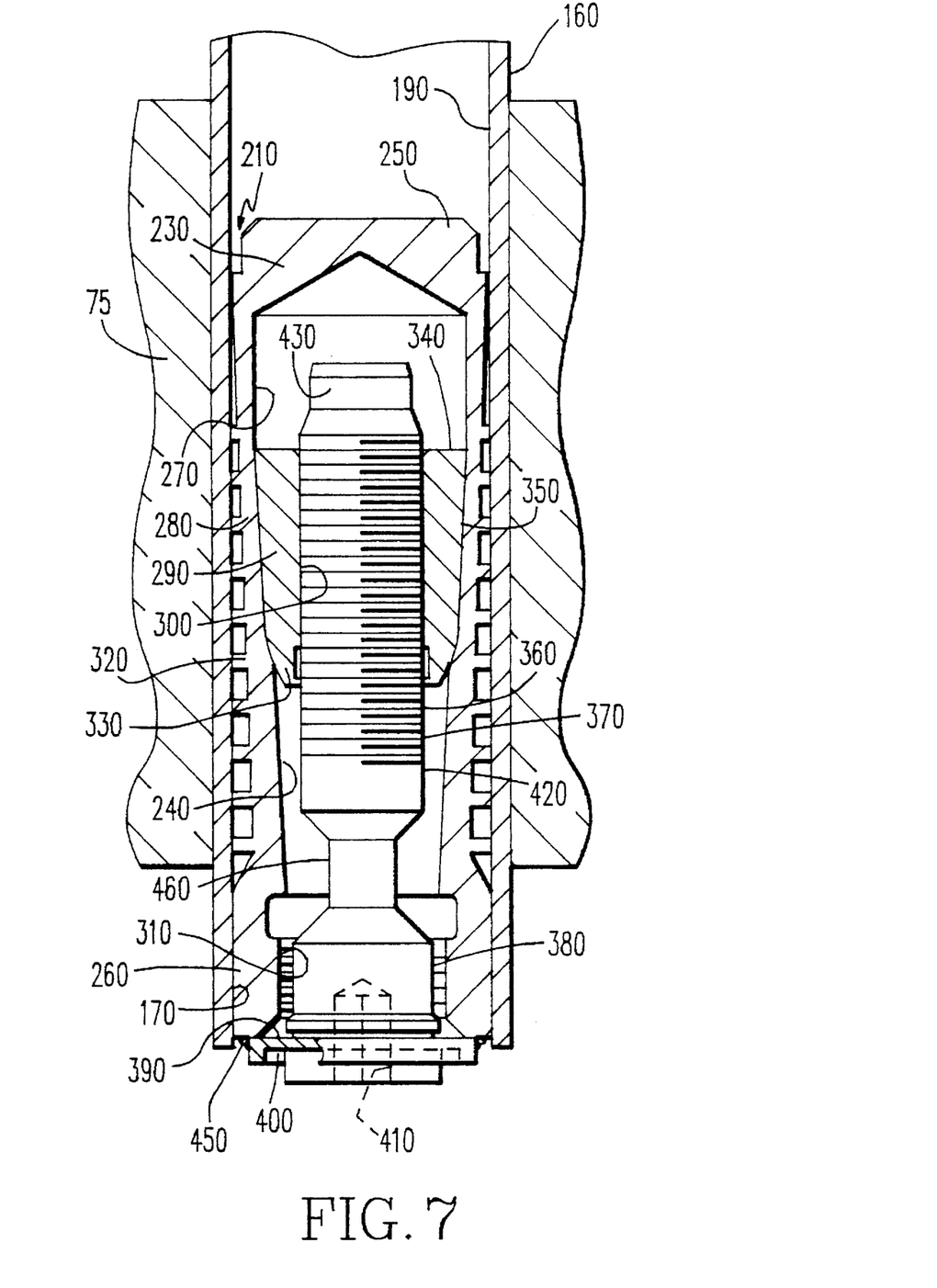
FIG. 7 shows in partial vertical section another embodiment of the tube plug.

Referring to FIG. 7, there is shown another embodiment of the invention, wherein shaft 420 has a cylindrical neck portion 460 of smaller diameter for providing flexibility to shaft 420 as shaft 230 is caused to threadably engage bore 300. Providing flexibility to shaft 420 reduces bending stress in shaft 420 as shaft 420 is lead into and threadably engaged with bore 300. In this manner, risk of breaking shaft 420 is reduced.

Figure 8:
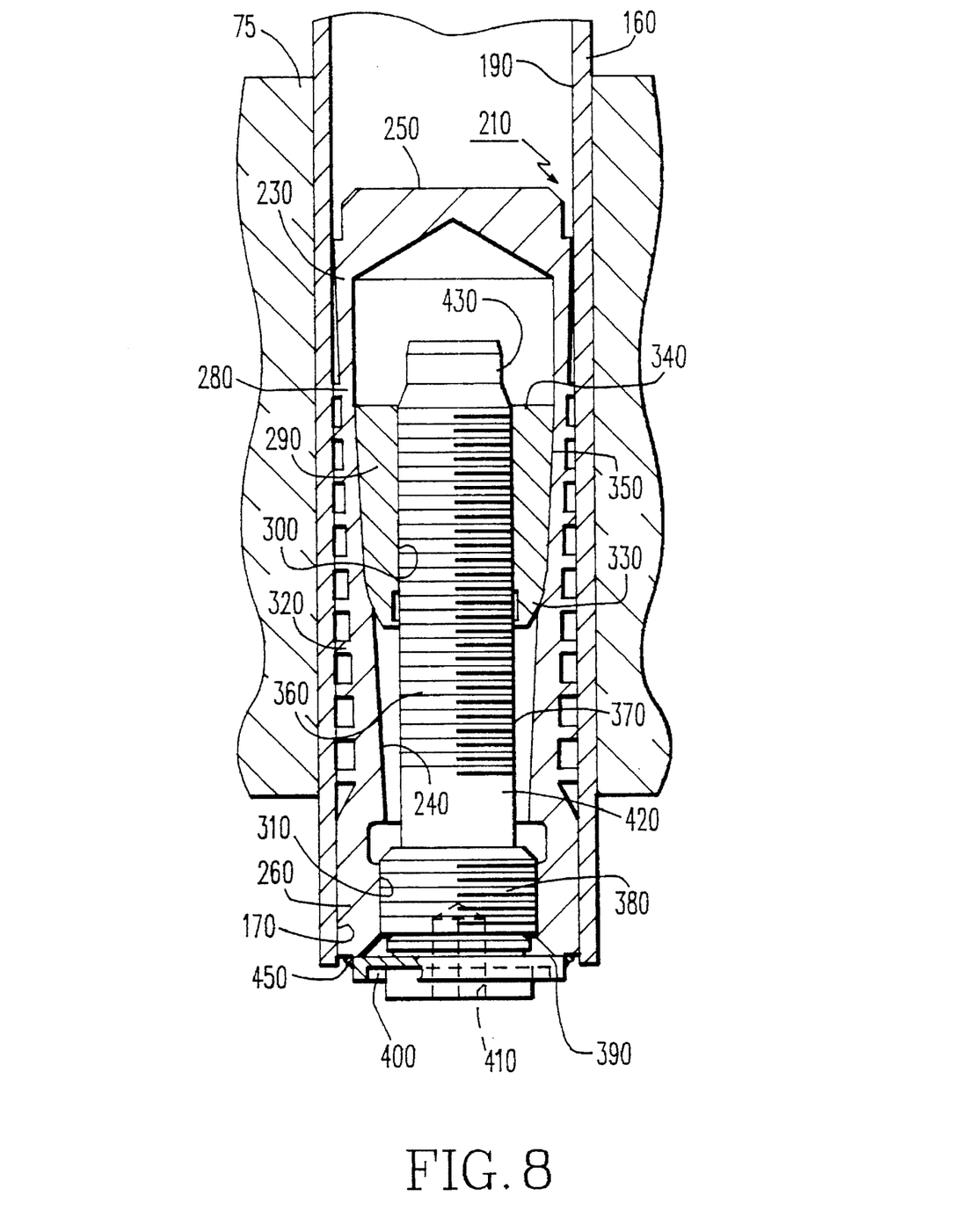
FIG. 8 shows yet another embodiment of the tube plug.

Referring to FIG. 8, there is shown yet another embodiment of the invention, wherein proximal end portion 380 has external threads thereon for threadably engaging threaded passageway 310. Of course, it will be appreciated that the thread pitch of passageway 310 should preferably be the same as the thread pitch for bore 300 to prevent galling or cross threading of the external and internal threads. The threaded engagement of proximal end portion 380 with passageway 310 provides added assurance that sealing member 220 will be maintained in sealing engagement with shell 230.

OPERATION

Plug portion 210 is suitably installed in tube 160 for sealing tube 160. Plug portion 210 may be sealingly installed in tube 160 in a manner well known in the art, such as disclosed in U.S. Pat. No. 4,390,042 issued Jun. 28, 1983 in the name of Harvey D.Kucherer et al. entitled "Tube Plug" and assigned to the Westinghouse Electric Corporation. After plug portion 210 is suitably installed in tube 160, lands 320 establish a labyrinth seal along the inner wall of tube 160 for sealing tube 160. However, it has been discovered by applicants that when plug portion 210 is composed of "INCONEL" which has undergone a particular annealing process, plug portion 210 itself may experience a primary water stress corrosion cracking problem because inner surface 240 of plug portion 210 is exposed to the primary water. If a crack (not shown) in plug portion 210 above expander member 290 should initiate and rapidly open, the small volume of primary water above expander member 290 may flash to steam because the primary water contacting inner surface 240 may have a temperature of approximately 650 degrees Fahrenheit and a pressure of approximately 2250 psia. Applicants have observed that this pressurized steam may break closed end 250 away from plug portion 210 and propel the closed end 250 upwardly along the inner wall 190 of tube 160 and possibly damage tube 160, thus allowing radioactive primary water to commingle with the nonradioactive secondary water.

Applicants have solved the problem recited hereinabove by sealing chamber 270 and by limiting the volume of the space above expander member 290 so that any stored energy in this space is minimized. Sealing chamber 270 and reducing the volume of the space above expander member 290 provide a tube plug having reduced susceptibility to stress corrosion cracking. To seal chamber 270, sealing member 220 is first brought into coaxial alignment with plug portion 210. Coaxial alignment of sealing member 220 with plug portion 210 may be accomplished by connecting sealing member to a robotic device (not shown), such as a Remotely Operated Service Arm available from the Westinghouse Electric Corporation located in Pittsburgh, Penna., and manipulating the robotic device such that the longitudinal axis of sealing member 220 is aligned with the longitudinal axis of plug portion 210. The robotic device is then maneuvered so that sealing member 220 is inserted into chamber 270 for inserting lead-in pilot section 430 into bore 300. As lead-in pilot section 430 advances into bore 300, threaded shaft 420 is rotated by inserting apparatus (not shown) into recess 410 and operating the apparatus so that threaded shaft 420 rotatably threadably engages threaded bore 300. Shaft 420 threadably engages bore 300 until flange 390 sealingly abuts open end 260 of shell 230 for sealing chamber 270. In this regard, sufficient torque is applied to shaft 420 to bring flange 390 into sealing metal-to-metal abutment with open end 260, which torque may be approximately 40 inch-pounds force (in-lbs). After sealing member 220 thusly engages bore 300 the robotic device then may be disconnected from sealing member 220. To reduce the volume of the space above expander member 290, lead-in pilot section 430 and a portion of shaft 420 will extend above expander member 290 when flange 390 abuts open end 260 (e.g., see FIG. 4). Therefore, lead-in pilot section 430 and a portion of shaft 420 will occupy some of the space above expander member 290 so that the volume of the space above expander member 290 is reduced. Moreover, it will be appreciated that when shaft 420 is inserted into bore 300, a portion of shaft 420 will extend above expander member 290 for limiting the volume of the space above expander member 290 so that the amount of any stored energy above expander member 290 is minimized should primary water admit past the seal formed between flange 390 and open end 260. It will be further appreciated that should primary water admit past the seal formed between flange 390 and open end 260, only a relatively small amount of this water will pass the threaded joint defined by the threaded engagement of shaft 420 and bore 300 for minimizing the amount of any stored energy above expander member 290.

Sealing member 220 may now be securely attached to shell 230, such as by welding. In this regard, flange 390 may be suitably welded to open end 260 by applying a plurality of tack welds 450, thereby attaching flange 390 to open end 260. Alternatively, a continuous weld bead may be applied around the circumferential edge of flange 390 for attaching sealing member 220 to shell 230. However, it has been observed by applicants that the presence of welds 450 may cause the flange material about the locus of each tack weld 450 to distort or bend due to weld distortion such that the seal between flange 390 and open end 260 is no longer maintained, thereby allowing primary fluid to enter chamber 270. To assist in preventing this, groove 400 is formed in flange 390 for providing a hinging action at the location of groove 400 so that even though weld distortion may occur at the loci of welds 450, the remainder of flange 390 will remain in sealing abutment with open end 260. That is, welds 450 will exert a force on flange 390 acting in a direction toward shell 230. An equal force will act on flange 390 in an opposite direction away from shell 230; however, this equal and opposite force will concentrate at groove 400. Thus, although the flange material located at the loci of welds 450 may distort, the hinging action due to the equal and opposite forces recited hereinabove allows the remainder of the flange material abutting open end 260 to continue in sealing abutment with open end 260. Thus, the presence of welds 450 do not disturb the sealing area of flange 390. Moreover, groove 400 also allows flange 390 to flex for maintaining flange 390 in sealingly abutting relationship to open end 260 as flange 390 is torqued into sealingly abutting relationship against open end 260.

In some operating steam generators plug portion 210 without sealing member 360 may have been previously installed for sealing tube 160. If such is the case, sealing member 360 will be later installed in plug portion 210 after plug portion 210 has experienced some service in steam generator 20. It will be understood that the configuration of sealing member 360 allows sealing member 360 to be disposed into such a previously installed plug portion 210 without damage to the plug portion 210. This is so because sealing member 360 is merely threadably inserted into plug portion 210. This is important because it is desirable to maintain the ability of plug portion to seal tube 160. That is, damage to plug portion 210 may compromise the ability of plug portion 210 to seal tube 160. Suitably threadably inserting sealing member 360 into plug portion 210 will preclude damage to plug portion 210. It will also be understood that because plug portion 210 will not be damaged during installation of sealing member 360, sealing member 360 may be removed from plug portion 210, if desired, in a fashion substantially the reverse of its installation such that plug portion 210 remains undamaged and continues to satisfactorily seal tube 160.

Although the invention is illustrated and described herein in several embodiments, it is not intended that the invention as illustrated and described be limited to the details shown, since various modifications may be obtained with respect to the invention without departing from the spirit of the invention or the scope of equivalents thereof. For example, the embodiment shown in FIG. 8 may have shaft 420 eliminated so that there is no shaft 420 to engage expander member 290. Of course, in this example, proximal end portion 380 will continue to threadably engage passageway 310.

Therefore, this invention provides a tube plug for plugging a heat exchanger tube, such as a nuclear steam generator tube, which tube plug has a reduced susceptibility to stress corrosion cracking.

What is claimed is:

1. A tube plug for plugging a tubular member having an inner wall, comprising:

(a) a shell having a closed end, an open end and an outer wall and defining a chamber in said shell in communication with the open end of said shell;

(b) an expander member having a threaded bore therethrough, said expander member disposed entirely within the chamber for expanding the outer wall of said shell into sealing engagement with the inner wall of the tubular member;

(c) an elongated sealing member having an externally threaded distal end portion threadably engaging the threaded bore of said expander member and a proximal end portion disposed in the open end of said shell, said sealing member having a predetermined cross sectional area; and (d) a flange integrally attached to and surrounding the proximal end portion of said sealing member for sealing the chamber defined by said shell, said flange extending radially outwardly from the proximal end portion of said sealing member for covering the open end of said shell, whereby said flange is drawn into sealing abutment with the open end of said shell and prevents liquid from entering the chamber as the distal end portion of said sealing member threadably engages the bore of said expander member.

2. The tube plug according to claim 1, wherein said flange is capable of being attached to the open end of said shell for attaching said sealing member to said shell.

3. The tube plug according to claim 2, wherein said flange has a groove therein for allowing said flange to flex as said flange is attached to the open end of said shell for maintaining said flange in sealingly abutting relationship to the open end of said shell.

4. The tube plug according to claim 3, wherein said sealing member has a neck portion of smaller cross-sectional area for providing flexibility to said sealing member as said sealing member threadably engages the threaded bore.

* * * * *